US010021332B2

(12) United States Patent
Uemura

(10) Patent No.: US 10,021,332 B2
(45) Date of Patent: Jul. 10, 2018

(54) IMAGE SENSOR, METHOD OF DRIVING AN IMAGE SENSOR, ELECTRONIC APPARATUS, AND PROGRAM

(71) Applicant: SONY CORPORATION, Tokyo (JP)

(72) Inventor: Koushi Uemura, Fukuoka (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 15 days.

(21) Appl. No.: 15/318,773

(22) PCT Filed: Jun. 11, 2015

(86) PCT No.: PCT/JP2015/066831
§ 371 (c)(1),
(2) Date: Dec. 14, 2016

(87) PCT Pub. No.: WO2015/198877
PCT Pub. Date: Dec. 30, 2015

(65) Prior Publication Data
US 2017/0127004 A1   May 4, 2017

(30) Foreign Application Priority Data

Jun. 25, 2014   (JP) ................................ 2014-129949

(51) Int. Cl.
*H04N 5/374* (2011.01)
*H04N 5/3745* (2011.01)
*H04N 5/378* (2011.01)

(52) U.S. Cl.
CPC ........... *H04N 5/3745* (2013.01); *H04N 5/378* (2013.01)

(58) Field of Classification Search
CPC .................................................... H04N 5/3745
(Continued)

(56) References Cited

U.S. PATENT DOCUMENTS 8,629,935 B2 * 1/2014 Kikuchi ............. H04N 5/23241
348/241
2010/0328302 A1 * 12/2010 Yamashita ........ H01L 27/14609
345/214

FOREIGN PATENT DOCUMENTS

JP        2000-152082        5/2000
JP        2003-348822 A     12/2003
(Continued)

OTHER PUBLICATIONS

International Search Report prepared by the Japan Patent Office dated Jun. 11, 2015, for International Application No. PCT/JP2015/066831.

*Primary Examiner* — Joel Fosselman
(74) *Attorney, Agent, or Firm* — Sheridan Ross P.C.

(57) ABSTRACT

The present disclosure relates to: an imaging element and an imaging-element drive method which enable negative-voltage fluctuation to be suppressed without increasing negative-voltage capacitance; an electronic device; and a program. A dual circuit is prepared for negative voltages. At times other than during exposure and reset, the negative voltage is supplied to readout transistors in lines other than a readout line. At timings other than these times, the negative voltage is supplied to the aforementioned readout transistors. Accordingly, even if the negative voltage fluctuates during exposure and reset, a stable negative voltage is supplied at timings at which other pixel data is read out, and thus fluctuation is suppressed. The present disclosure is applicable to imaging elements.

10 Claims, 14 Drawing Sheets

(58) Field of Classification Search
USPC .......................................................... 348/308
See application file for complete search history.

(56) References Cited

FOREIGN PATENT DOCUMENTS

| | | |
|---|---|---|
| JP | 2005-323331 A | 11/2005 |
| JP | 2008-042305 A | 2/2008 |

\* cited by examiner

IMAGE SENSOR, METHOD OF DRIVING AN IMAGE SENSOR, ELECTRONIC APPARATUS, AND PROGRAM

CROSS REFERENCE TO RELATED APPLICATIONS

This application is a national stage application under 35 U.S.C. 371 and claims the benefit of PCT Application No PCT/JP2015/066831 having an international filing date of 11 Jun. 2015, which designated the United States, which PCT application claimed the benefit of Japanese Patent Application No. 2014-12049 filed 25 Jun. 2014, the disclosures of which are incorporated herein by reference in their entirety.

TECHNICAL FIELD

The present invention relates to an image sensor, a method of driving an image sensor, an electronic apparatus, and a program, and specifically relates to an image sensor, a method of driving an image sensor, an electronic apparatus, and a program capable of increase the image quality.

BACKGROUND ART

In the past, in a CMOS (Complementary Metal Oxide Semiconductor) image sensor, when readout transistors for reading out pixel signals are turned off, a negative voltage VRL generated by a charge pump is input in the gates of the readout transistors via readout-control signal lines TR (0 to m: m is an identifier for identifying each readout row) in order to increase pixel characteristics. In other words, since all the pixel-signal readout transistors except for the readout row are turned off, the negative voltage VRL is input in almost all the readout-control signal lines.

Meanwhile, since the control signal lines in which the negative voltage VRL is input are wired above the pixels physically, the control signal lines have coupling components with vertical transfer lines VSL (0 to n: n is an identifier for identifying each vertical transfer line VSL) and floating diffusions FD (0 to i: i is an identifier for identifying each floating diffusion FD). As a result, variation components of the negative voltage VRL deteriorate pixel data of the vertical transfer lines VSL (0 to n) via the vertical transfer lines VSL (0 to n) and the floating diffusions FD (0 to i).

For example, even according to a correlated-double-sampling signal processing, it is difficult to remove noise components due to variations of negative voltages and offset components between samples. Therefore noises remain in AD (Analog/Digital)-converted pixel signals, and the quality of a captured image is deteriorated as a result (see Patent Documents 1 and 2).

Further, there are two kinds of variation components of the negative voltage VRL, i.e., noises generated by a charge pump itself and variations due to coupling and driving pixels.

Some technologies are proposed to solve one of them, i.e., noises generated by a charge pump itself (see Patent Documents 3 and 4).

Meanwhile, there is known a method of increasing a negative voltage capacitor to reduce variations due to coupling and driving pixels.

Patent Document 1: Japanese Patent Application Laid-open No. 2000-152082

Patent Document 2: Japanese Patent Application Laid-open No. 2005-323331

Patent Document 3: Japanese Patent Application Laid-open No. 2003-348822

Patent Document 4: Japanese Patent Application Laid-open No. 2008-042305

SUMMARY OF INVENTION

Problem to be Solved by the Invention

However, even if a negative voltage capacitor is increased, variations due to coupling and driving pixels cannot be removed completely.

Further, a larger negative voltage capacitor is disadvantageous to upsize an image sensor since the coupling amount and the transfer load increase in proportion to the number of pixels.

The present technology has been made in view of the above-mentioned circumstances specifically to reduce variations of a negative voltage and to increase the image quality without increasing a negative voltage capacitor.

Means for Solving the Problem

According to an aspect of the present technology, an image sensor includes: photodiodes, each of the photodiodes generating an electric charge corresponding to an intensity of incident light for each pixel; readout transistors, each of the readout transistors reading the electric charge generated by each of the photodiodes; a first negative voltage supplier that supplies a negative voltage to the readout transistors when the readout transistors are not turned on; and a second negative voltage supplier that supplies a negative voltage to the readout transistors when the readout transistors are not turned on, in which one of the first negative voltage generator and the second negative voltage generator is selected and supplies the negative voltage.

The first negative voltage supplier may be selected and supply the negative voltage at a time of start of exposure of the photodiodes to light and at a time of resetting, and the second negative voltage supplier may be selected and supply the negative voltage at times other than those times.

The image sensor may further include a pulse generator that generates a pulse signal, in which the first negative voltage supplier may be selected and supply the negative voltage at a time of start of exposure of the photodiodes to light and at a time of resetting, and the second negative voltage supplier may be selected and supply the negative voltage at times other than those times, on the basis of a pulse generated by the pulse generator.

The first negative voltage supplier may be a first negative voltage capacitor, and the second negative voltage supplier may be a second negative voltage capacitor.

Each of the first negative voltage capacitor and the second negative voltage capacitor may be charged by a charge pump circuit.

The first negative voltage supplier may be selected and supply the negative voltage to the readout transistors of rows sharing a floating diffusion with a transistor of a readout row out of the readout transistors not turned on, and the second negative voltage supplier may be selected and supply the negative voltage to the readout transistors of non-selected rows other than those rows.

The first negative voltage supplier may supply the negative voltage to a predetermined percentage of the non-selected rows at predetermined intervals.

According to an aspect of the present technology, a method of driving an image sensor including photodiodes, each of the photodiodes generating an electric charge corresponding to an intensity of incident light for each pixel, readout transistors, each of the readout transistors reading the electric charge generated by each of the photodiodes, a first negative voltage supplier that supplies a negative voltage to the readout transistors when the readout transistors are not turned on, and a second negative voltage supplier that supplies a negative voltage to the readout transistors when the readout transistors are not turned on, includes: selecting one of the first negative voltage generator and the second negative voltage generator, and supplying the negative voltage by the selected negative voltage generator.

According to an aspect of the present technology, a program causes a computer that controls an image sensor including photodiodes, each of the photodiodes generating an electric charge corresponding to an intensity of incident light for each pixel, readout transistors, each of the readout transistors reading the electric charge generated by each of the photodiodes, a first negative voltage supplier that supplies a negative voltage to the readout transistors when the readout transistors are not turned on, and a second negative voltage supplier that supplies a negative voltage to the readout transistors when the readout transistors are not turned on, to select one of the first negative voltage generator and the second negative voltage generator, and supply the negative voltage by the selected negative voltage generator.

According to an aspect of the present technology, an electronic apparatus includes: photodiodes, each of the photodiodes generating an electric charge corresponding to an intensity of incident light for each pixel; readout transistors, each of the readout transistors reading the electric charge generated by each of the photodiodes; a first negative voltage supplier that supplies a negative voltage to the readout transistors when the readout transistors are not turned on; and a second negative voltage supplier that supplies a negative voltage to the readout transistors when the readout transistors are not turned on, in which one of the first negative voltage generator and the second negative voltage generator is selected and supplies the negative voltage.

According to an aspect of the present technology, each of photodiodes generates an electric charge corresponding to an intensity of incident light for each pixel; each of readout transistors reads the electric charge generated by each of the photodiodes; a first negative voltage supplier supplies a negative voltage to the readout transistors when the readout transistors are not turned on; and a second negative voltage supplier supplies a negative voltage to the readout transistors when the readout transistors are not turned on, in which one of the first negative voltage generator and the second negative voltage generator is selected and supplies the negative voltage.

According to an aspect of the present technology, an image sensor may be an independent device or a block for capturing an image.

Effects of the Invention

According to an aspect of the present technology, it is possible to increase the image quality by reducing variations of a negative voltage without increasing a negative voltage capacitor.

MODES FOR CARRYING OUT THE INVENTION

<Example of Configuration of Circuit for Driving Image Sensor>

Figure 1:
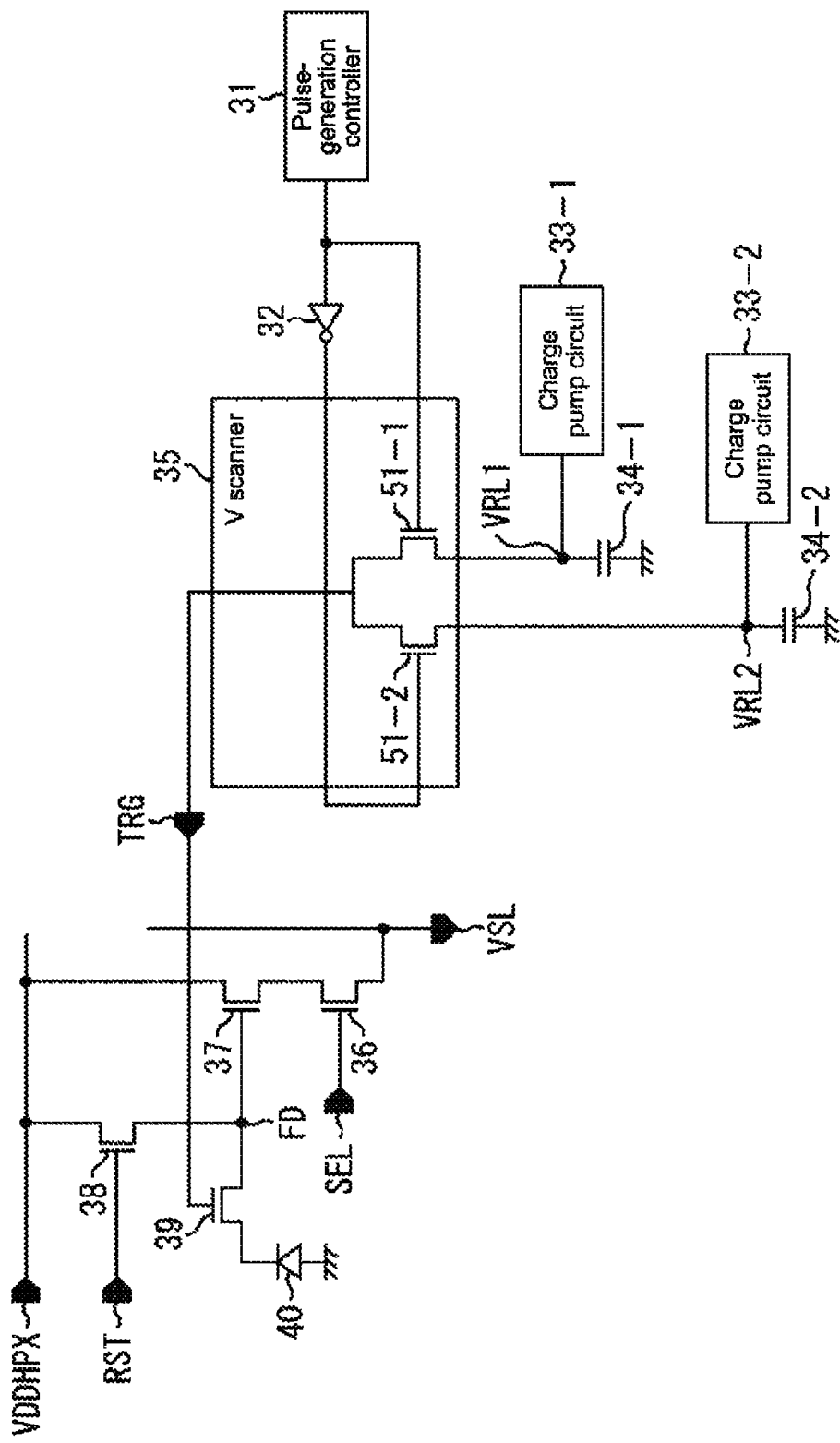
FIG. 1 A diagram showing an example of a configuration of a circuit for driving an image sensor according to an embodiment, to which the present technology is applied.

FIG. 1 shows an example of a configuration of a circuit for driving an image sensor according to an embodiment, to which the present technology is applied. The driving circuit of FIG. 1 is a driving circuit for driving an image sensor mounted on an electronic apparatus such as an imaging apparatus or a mobile phone, and is a circuit that supplies a negative voltage VRL to a readout transistor that is turned off.

More specifically, the driving circuit of FIG. 1 includes the pulse-generation controller 31, the inverter 32, the charge pump circuits 33-1, 33-2, the negative voltage capacitors 34-1, 34-2, the V scanner 35, the selection transistor 36, the amplifier transistor 37, the reset transistor 38, the readout transistor 39, and the photodiode 40.

More specifically, each of the charge pump circuits 33-1, 33-2 is a circuit that generates the negative voltage VRL to be supplied to the readout transistor 39, which is turned off, and each of the negative voltage capacitors 34-1, 34-2 is charged with the generated negative voltage VRL. Note that the negative voltage capacitors 34-1, 34-2 are charged with negative voltages, which will be referred to as the negative voltages VRL1, VRL2, respectively.

The V scanner 35 selects one of the negative voltages VRL1, VRL2, the negative voltage capacitors 34-1, 34-2 being charged with those voltages, and supplies the selected negative voltage to the readout transistor 39 of a row not being read out. More specifically, the V scanner 35 includes the transistors 51-1, 51-2, receives a pulse signal generated by the pulse-generation controller 31 input in the gate of the transistor 51-1, and receives the pulse signal generated by the pulse-generation controller 31 input in the gate of the transistor 51-2 via the inverter 32. According to this configuration, for example, when the transistors 51-1, 51-2 are Hi-active and when the pulse supplied from the pulse-generation controller 31 is Hi, the transistor 51-1 is turned on and the transistor 51-2 is turned off. To the contrary, when the pulse supplied from the pulse-generation controller 31 is Low, the transistor 51-1 is turned off and the transistor 51-2 is turned on. As a result, the V scanner 35 selects the negative voltage VRL1 or VRL2 depending on the Hi or Low pulse generated by the pulse-generation controller 31, and outputs the selected negative voltage.

Note that the driving circuit of FIG. 1 supplies the negative voltage VRL supplied to the gate of the readout transistor 39, which is turned off. However, as a matter of course, although not shown in the drawings, according to another configuration, a power-supply voltage VDD is supplied when the readout transistor 39 is turned on, and it is switched when the readout transistor 39 is turned on or off.

Further, the charge pump circuits 33-1, 33-2 may be one charge pump circuit having an enough capacity, which supplies voltages to both the negative voltage capacitors 34-1, 34-2.

When the readout transistor 39 is turned on, an electric charge generated by the photodiode 40 is transferred to the floating diffusion FD. The floating diffusion FD outputs the charged electric charge to the gate of the amplifier transistor 37. The amplifier transistor 37 outputs a pixel signal, which depends on the amount of the electric charge transferred from the floating diffusion FD, to the selection transistor 36. When the selection transistor 36 is turned on, the selection transistor 36 transfers the pixel signal, which is output from the amplifier transistor 37, to the vertical transfer line VSL.

<Configuration of Typical Driving Circuit>

Next a configuration and a behavior of a typical driving circuit will be described prior to describing a behavior of the driving circuit of FIG. 1.

Figure 2:
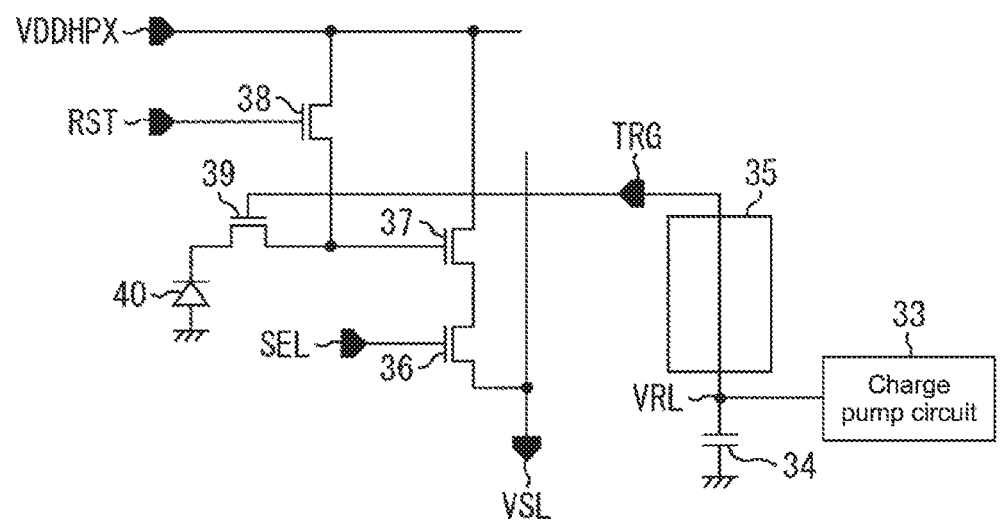
FIG. 2 A diagram showing a configuration of a typical driving circuit.

FIG. 2 is a diagram showing a configuration of a typical driving circuit. Note that the configurations whose functions are the same as the functions of the configurations of FIG. 1 will be denoted by the same reference symbols and the same names, and description thereof will be omitted arbitrarily.

In other words, the differences between the configuration of the driving circuit of FIG. 1 of the present technology and the configuration of the typical driving circuit are that the typical driving circuit includes only one charge pump circuit 33 and only one negative voltage capacitor 34 and that the typical driving circuit therefore includes no transistors 51-1, 51-2 and no inverter 32.

Figure 3:
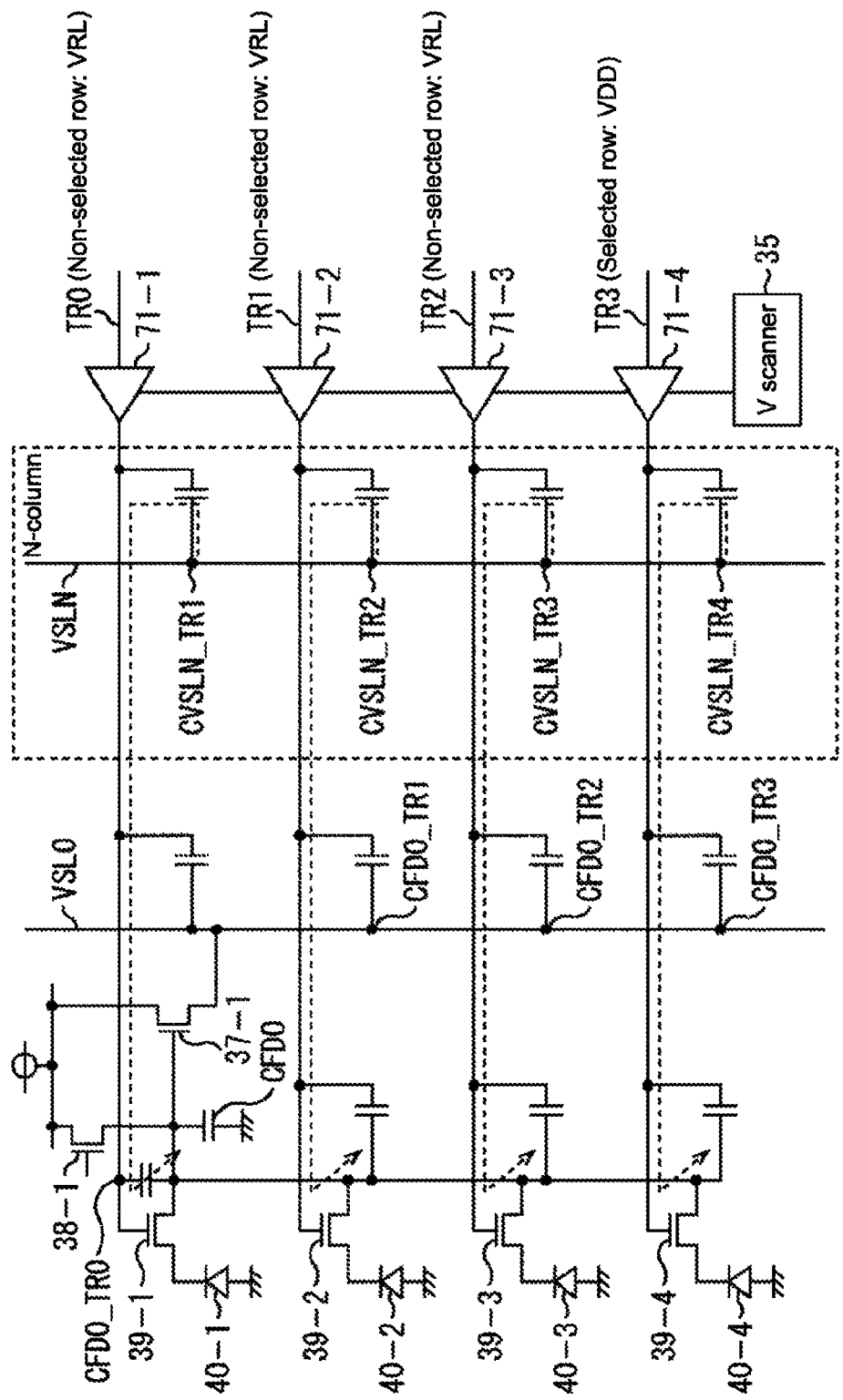
FIG. 3 A diagram showing an example of the behavior of the driving circuit.

For example, as shown in FIG. 3, an example of the behavior of the driving circuit of FIG. 2, in which pixel signals for four rows are controlled, will be described.

Note that, from the top of FIG. 3, the control signal lines TR0 to TR3 of the 0th row to 3rd rows have the amplifier transistors 37-1 to 37-4, the reset transistor 38-1, the readout transistors 39-1 to 39-4, and the photodiodes 40-1 to 40-4, respectively.

Note that, hereinafter, the amplifier transistors 37-1 to 37-4, the reset transistor 38-1, the readout transistors 39-1 to 39-4, and the photodiodes 40-1 to 40-4 will be simply referred to as the selection transistor 36, the amplifier transistor 37, the reset transistor 38, the readout transistor 39, and the photodiode 40 when it is not necessary to distinguish therebetween, respectively, and the same shall apply to other configurations. Further, the floating diffusion CFDO is common to the four pixels.

The rows have the amplifiers 71-1 to 71-4, and voltages for turning on or off the readout transistors 39-1 to 39-4 are supplied to the gates of the amplifiers 71-1 to 71-4 via the control signal lines TR0 to TR3, respectively. More specifically, the amplifier 71 supplies the power-supply voltage VDD, not shown, to the gate of the readout transistor 39 when the readout transistor 39 is turned on, and the amplifier 71 supplies the negative voltage VRL to the gate of the readout transistor 39 when the readout transistor 39 is turned off.

Further, the vertical transfer line VSL0 of FIG. 3 transfers an electric-charge signal, which is transferred from one of the photodiodes 40-1 to 40-4 of the 0-column via the floating diffusion FD, via the amplifier transistor 37-1. Further, the vertical transfer line VSLN transfers an electric-charge signal, which is transferred from the photodiode 40-N (not shown) of the N-column and from the floating diffusion, not shown, FD (not shown), via the amplifier transistor 37-N (not shown).

<Behavior of Typical Driving Circuit of FIG. 2>

Next, a behavior of the typical driving circuit of FIG. 2 will be described.

For example, when the readout transistors 39-1 to 39-3 of the control signal lines TR0 to 2 of the 1st row to the 3rd row in the vertical direction of FIG. 3 are turned off (non-selected rows) and the readout transistor 39-4 of the control signal line TR3 of the 4th row is turned on, the amplifier 71-4 supplies the power-supply voltage VDD to the gate of the readout transistor 39-4. Meanwhile, the amplifiers 71-1 to 71-3 supply the negative voltages VRL, which are supplied from the V scanner 35, to the readout transistors 39-1 to 39-3.

Figure 4:
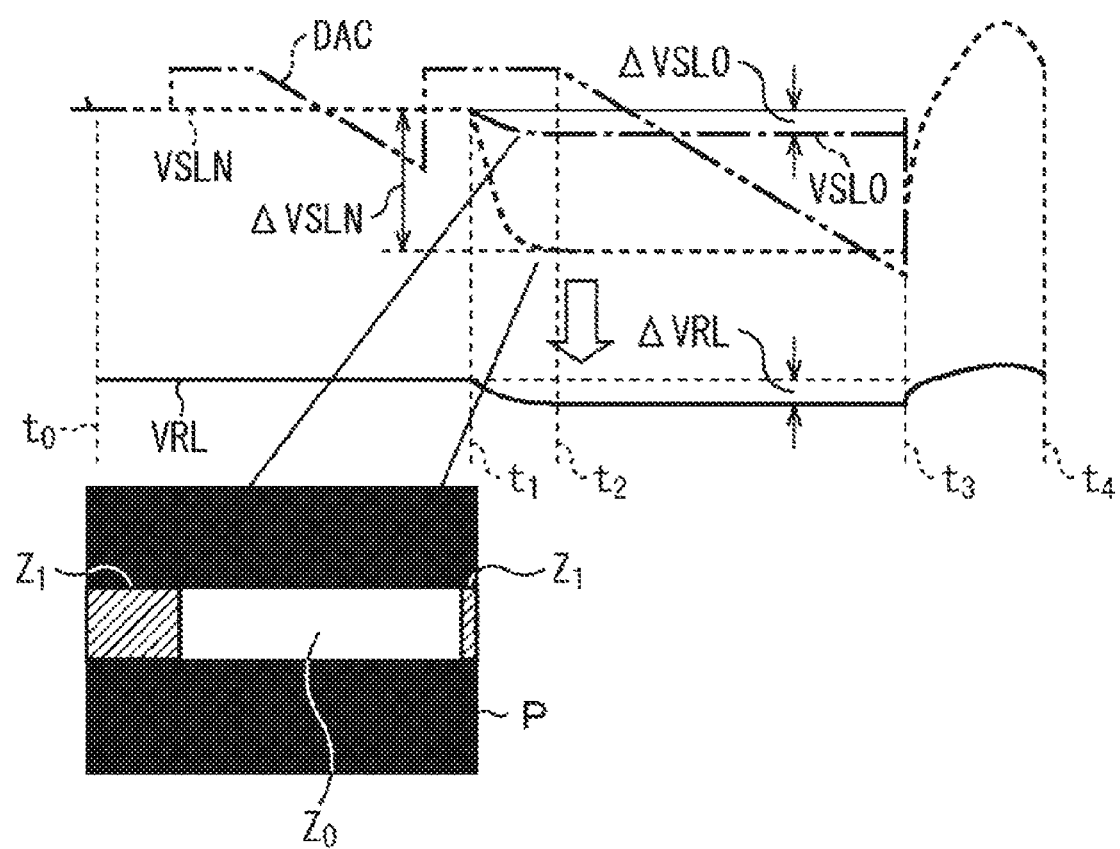
FIG. 4 A diagram for illustrating streaking.

In other words, as shown in FIG. 4, the vertical transfer line voltages VSL0, VSLN of the vertical transfer line VSL0 are reset and are 0 between the time t0 and t1. In this case, an offset at the time of resetting is counted and read as the counter DAC.

Further, when an image, i.e., the image P whose central the areas Z1 is exceptionally white as shown in the lower-left part of FIG. 4, is captured after exposure to light between the time t1 and t2 and when the white area includes the N-th column, the vertical transfer line voltage VSLN of the vertical transfer line VSLN of the N-th column is decreased by displacement ΔVSLN affected by the coupling capacity CVSL_TRN between the vertical transfer line VSLN and the output line of the amplifier 71-N to the readout transistor 39-N of the N-th column.

In other words, at this time, since the vertical transfer line voltage VSLN is decreased by the displacement ΔVSLN, the negative voltage VRL is decreased by the displacement ΔVRL as well.

Here, the relation between the displacement ΔVRL and the displacement ΔVSLN satisfies the following formula (1).

$$\Delta VRL = \Delta VSLN \times CVSL\_TRN/(CVRL+CVSL\_TRN) \quad (1)$$

Here, ΔVRL is the displacement of the negative voltage VRL of FIG. 4, ΔVSLN is the displacement of the vertical transfer line voltage VSLN of FIG. 4, CVSL_TRN is the coupling capacity between the vertical transfer line VSLN and the control signal line TR(N−1) of the amplifier 71-N to the readout transistor 39-N of the N-th column, and CVRL is the capacity of the negative voltage capacitor 34.

Further, as shown in the waveform of the upper part of FIG. 4, the vertical transfer line voltage VSL0 of the 0th row, which should be a black area, is decreased by the displacement ΔVSL0 together with the displacement ΔVRL of the negative voltage VRL.

Here, the relation between the displacement ΔVSL0 and the displacement ΔVRL satisfies the following formula (2).

$$\Delta VSL0 = \Delta VFD0 = \Delta VRL \times ((CFD0\_TR0+CFD0\_TR1+CFD0\_TR2)/(CFD0)) \quad (2)$$

Here, the displacement ΔVSL0 is the displacement of the vertical transfer line voltage VSL0 of the 0th row of FIG. 4, ΔVFD0 is the displacement of the charge voltage of the floating diffusion FD of the 0th row, ΔVRL is the displacement of the negative voltage VRL of FIG. 4, CFD0_TR0 to CFD0_TR2 are the coupling capacities between the vertical transfer line VSLN and the output lines of the amplifiers 71-1 to 71-3 to the readout transistors 39-1 to 39-3 of the the 1st to 3rd rows, respectively, and CFD0 is the capacity of the floating diffusion FD.

In other words, as shown in the lower-left part of FIG. 4, when the area Z0 of the image P is exceptionally white (pixel value=maximum), a so-called streaking phenomenon occurs, in which a recognized image contains the areas Z1 whose height in the horizontal direction is the same as that of the area Z0 are not real black but contain blight clipped-whites exceptionally, although the area except the area Z0 should be black (pixel value=minimum).

Note that, in the upper part of FIG. 4, the horizontal axis is the time axis and the vertical axis shows as follows; the solid line shows the negative voltage VRL, the dotted line shows the transfer voltage VSLN of a pixel column, which is the N-th column in the horizontal direction, and the dot-and-dash line shows the transfer voltage VSL0 of a pixel column, which is at the left end in the horizontal direction.

Further, when exposure to light is finished at the time t2, pixel signals are read out between the time t2 and t3, and the signals of the pixels exposed to light are read as the counter DAC.

The reset operation is performed between the time t3 and t4, the electric charge is discharged, and preparation for the next time is started.

As shown in the formula (1), the displacement ΔVRL of the negative voltage VRL may be reduced by somewhat increasing the negative voltage capacitor CVRL, but the displacement ΔVRL cannot be zero. Further, a coupling capacity or a transfer load is in proportion to the number of pixels, which is disadvantageous to upsize an image sensor.

<Behavior of Driving Circuit of FIG. 1>

Next, a behavior of the driving circuit of FIG. 1 will be described.

Since streaking may occur in a typical driving circuit as described above, the driving circuit of FIG. 1 reduces occurrence of streaking by behaving as follows. Note that the condition of the behavior is similar to the condition described above.

Figure 5:
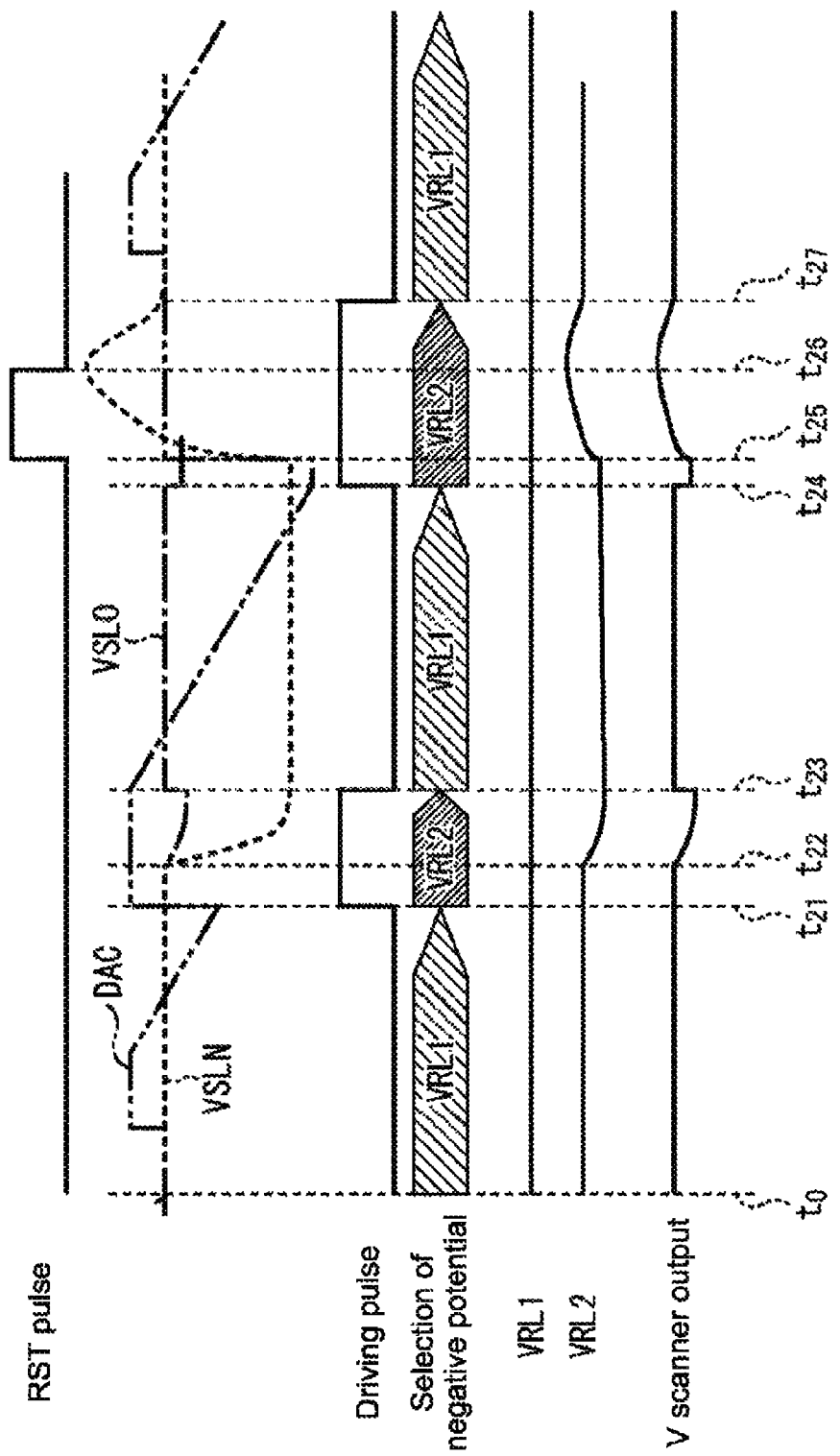
FIG. 5 A timing chart for illustrating the behavior of the driving circuit of FIG. 1.

In other words, as shown in FIG. 5, the reset processing is performed between the time t0 and t21, and the pulse-generation controller 31 generates no driving pulse. In other words, in this case, the transistor 51-1 is turned on and the transistor 51-2 is turned off. As a result, the V scanner 35 outputs the negative voltage VRL1 from the negative voltage capacitor 34-1 charged by the charge pump circuit 33-1. In this case, both the vertical transfer line voltages VSL0, VSLN are zero without being changed. Further, at the same time, the offset pixel value is read as the counter DAC.

At the time t21 immediately before the time t22, at which exposure to light is to be started, the pulse-generation controller 31 generates the driving pulse. As a result, the transistor 51-1 is turned off and the transistor 51-2 is turned on. As a result, the V scanner 35 outputs the negative voltage VRL2 from the negative voltage capacitor 34-2 charged by the charge pump circuit 33-2.

Then, exposure to light is started at the time t22. At this time, the vertical transfer line voltages VSL0, VSLN vary similar to the variations described with reference to FIG. 4, and the negative voltage VRL2 varies similar to the variation of the negative voltage VRL described with reference to FIG. 4.

At the time t23, the pulse-generation controller 31 stops generating the driving pulse. As a result, the transistor 51-1 is turned on and the transistor 51-2 is turned off. As a result, the V scanner 35 outputs the negative voltage VRL1 from the negative voltage capacitor 34-1 charged by the charge pump circuit 33-1.

In this case, the original negative voltage VRL1 is output as it is, the negative voltage VRL1 being not affected by the variations of the vertical transfer line voltages VSL0, VSLN, and therefore the displacement ΔVSL0 of the vertical transfer line voltage VSL0 is zero, which should be zero.

Then, between the time t23 and t24, the electric charge is read as the counter DAC, the vertical transfer line voltage VSL0 being proper.

When reading-out is finished at the time t24, the pulse-generation controller 31 generates the driving pulse. As a result, the transistor 51-1 is turned off and the transistor 51-2 is turned on. As a result, the V scanner 35 outputs the negative voltage VRL2 from the negative voltage capacitor 34-2 charged by the charge pump circuit 33-2.

When the negative voltage VRL2 is selected as described above, the reset pulse is generated and the reset processing is performed between the time t25 and S26.

Then, at the time t27 after a predetermined time period has passed after stop of the reset pulse, the processing after the time t0 is repeated again.

According to the above-mentioned processing, the negative voltage VRL2 is selected in a predetermined time period including the start of exposure to light and in a predetermined time period including the start of resetting, i.e., in the time periods in which the vertical transfer line voltages VSL0, VSLN vary. The negative voltage VRL1 is selected in the time periods in which the pixel signal is read.

As a result, in the time periods in which the pixel signal is read, it is possible to supply the negative voltage VRL1, which is not affected by the variations of the vertical transfer line voltages VSL0, VSLN, and it is therefore possible to reduce effects of a coupling capacity.

In other words, as shown by the third line from the bottom of FIG. 5, the negative voltage VRL1 is always constant since the negative voltage VRL1 is not affected by the variations of the vertical transfer line voltages VSL0, VSLN. To the contrary, as shown by the second line from the bottom of FIG. 5, the negative voltage VRL2 varies since the negative voltage VRL2 is affected by the variations of the vertical transfer line voltages VSL0, VSLN. However, the negative voltage VRL1 is supplied only in the time periods, in which the pixel signal is read while the negative voltage VRL1 is not affected by variations, which has no effects as a whole. Therefore, as shown by the lowermost line of FIG. 5, when the V scanner outputs any one of the negative voltages VRL1, VRL2 selected, the vertical transfer line voltage VSL0 can be always zero in the readout time periods, and, as a result, it is possible to reduce occurrence of streaking.

Further, at this time, since it is only necessary to provide the negative voltage capacitors having the same capacity and to select one of them without increasing a negative voltage capacitor as in the past, it is possible to support the larger number of pixels. Therefore there is no disadvantage even in upsizing an image sensor.

Note that FIG. 5 shows, in descending order, the RST (reset) pulse, the vertical transfer line voltages VSL0, VSLN, the counter DAC, the driving pulse, the selection of negative potential (any one of the negative voltages VRL1, VRL2), the negative voltages VRL1, VRL2, and the V scanner output.

<Behavior for Reducing Effect to Shutter Load>

An example of the behavior for reducing streaking has been described above. According to an alternative behavior, shutter unevenness, which results from the difference between the shutter load of a valid area and the shutter load of a dummy area, may be reduced.

In other words, there are a pixel area, which is a valid area including a pixel area used as a pixel signal, and a pixel area, which is a dummy area not used as a pixel signal.

The difference between the shutter load of a pixel of the valid area and the shutter load of a pixel of the dummy area when accessed results in the difference of the consumption electric charge of the negative voltage. As a result, unevenness, i.e., so-called shutter unevenness, occurs.

Figure 6:
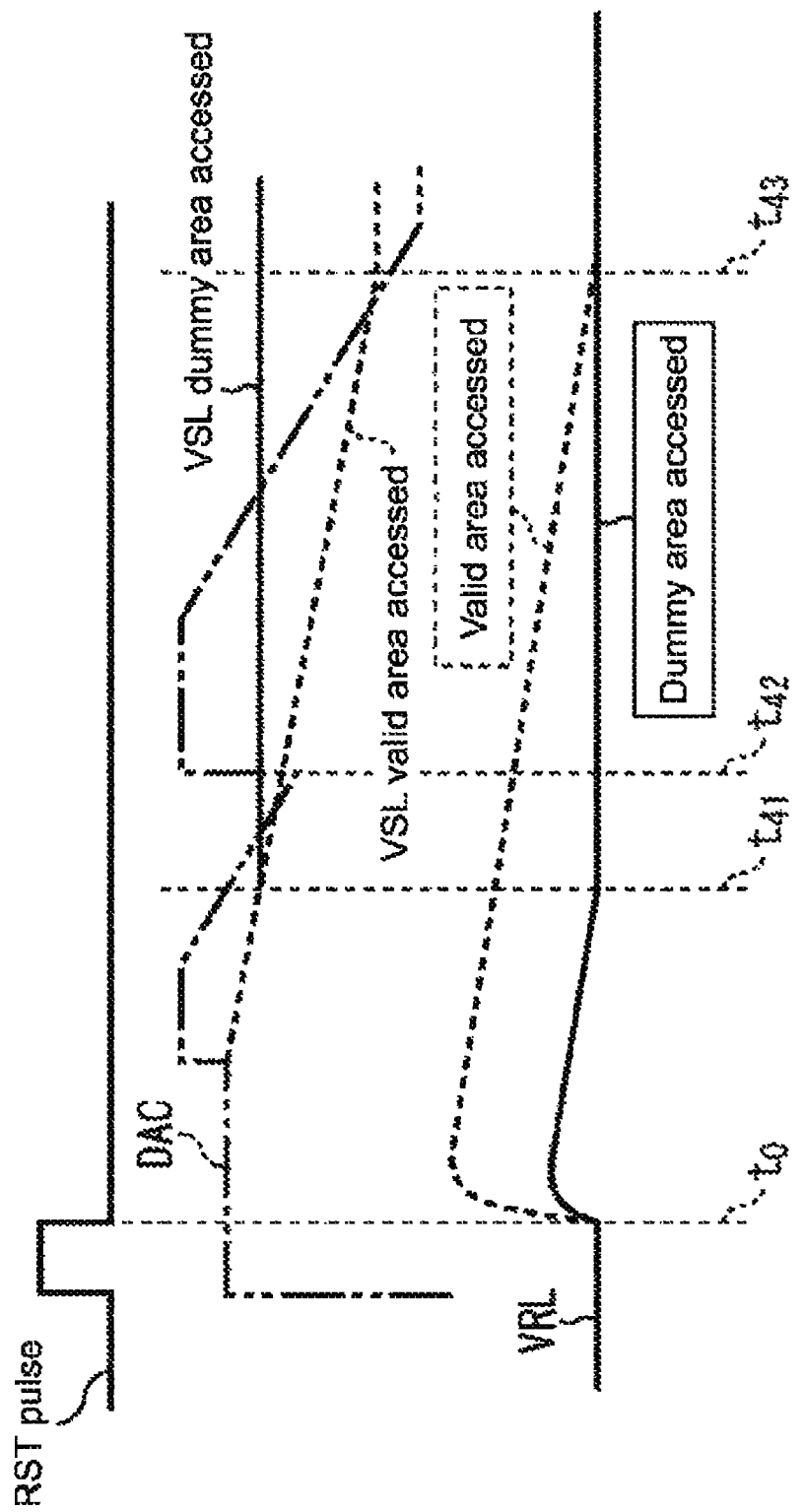
FIG. 6 A timing chart for illustrating the behavior of the typical driving circuit in shuttering.

Therefore, for example, according to the shutter behavior of the above-mentioned typical driving circuit, as shown in FIG. 6, at the time t0 at which the reset pulse drops, the variation of the negative voltage VRL of a pixel of the valid area shown by the dotted line is larger than the variation of the negative voltage VRL of a pixel of the dummy area shown by the solid line.

Therefore, as shown in FIG. 6, after the time t41 at which the variation of the negative voltage VRL of a pixel of the dummy area ends, the output vertical transfer line voltage VSL can be constant. To the contrary, because the variation of the negative voltage VRL of a pixel of the valid area does not end until the time t42, the vertical transfer line voltage VSL drops due to the variation of the negative voltage VRL until then.

Figure 7:
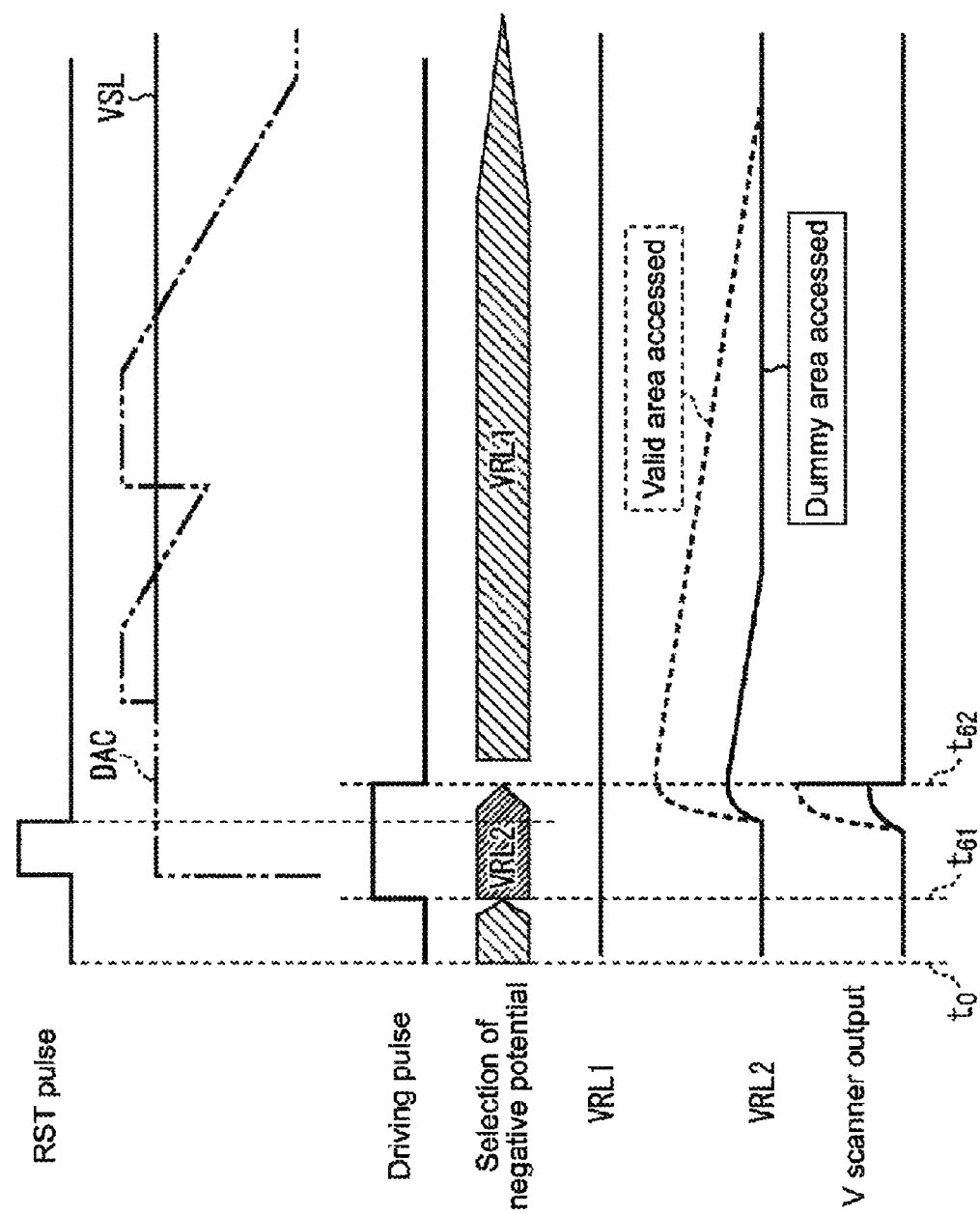
FIG. 7 A timing chart for illustrating the behavior of the driving circuit of FIG. 1 in shuttering.

In view of this, the driving circuit of FIG. 1 behaves as shown in FIG. 7 to reduce shutter unevenness.

In other words, at the time t61 before the reset pulse rises, the pulse-generation controller 31 generates the driving pulse. As a result, the transistor 51-1 is turned off and the transistor 51-2 is turned on. As a result, the V scanner 35 outputs the negative voltage VRL2 from the negative voltage capacitor 34-2 charged by the charge pump circuit 33-2.

The reset pulse is generated after that. At the time t62 at which the reset pulse drops, the pixels of the valid area and the pixels of the dummy area are shutter-on. Therefore, the negative voltage VRL2 (i.e., output from the V scanner 35) is increased in a pixel of the valid area as shown by the lowermost dotted line and the second dotted line from the bottom of FIG. 7. The negative voltage VRL2 (i.e., output from the V scanner 35) is increased in a pixel of the dummy area as shown by the solid lines.

However, as shown by the third line from the bottom of FIG. 7, the negative voltage VRL1 is always constant in this time period because the negative voltage VRL1 is not affected.

At the time t63, the pulse-generation controller 31 stops generating the driving pulse. As a result, the transistor 51-1 is turned on and the transistor 51-2 is turned off. As a result, the V scanner 35 outputs the negative voltage VRL1 from the negative voltage capacitor 34-1 charged by the charge pump circuit 33-1.

As a result, since the negative voltage VRL1 is selected, the vertical transfer line voltage VSL is not affected by the variation of the negative voltage VRL and the output voltage is always constant.

As a result, the ratio between the vertical transfer line voltage VSL and the negative voltage VRL, i.e., PSRR: Power Supply Rejection Ratio (power-supply voltage variation rejection ratio=(variation of power-supply voltage)/(variation of output voltage)) is improved, and it is thus possible to reduce occurrence of shutter unevenness.

<Way to Improve Negative Voltage Recovery Time of Global Shutter>

An example of a way to improve shutter unevenness has been described above. By applying the similar technology, it is possible to reduce effects of the recovery time of the negative voltage VRL of a global shutter to reading-out.

Figure 8:
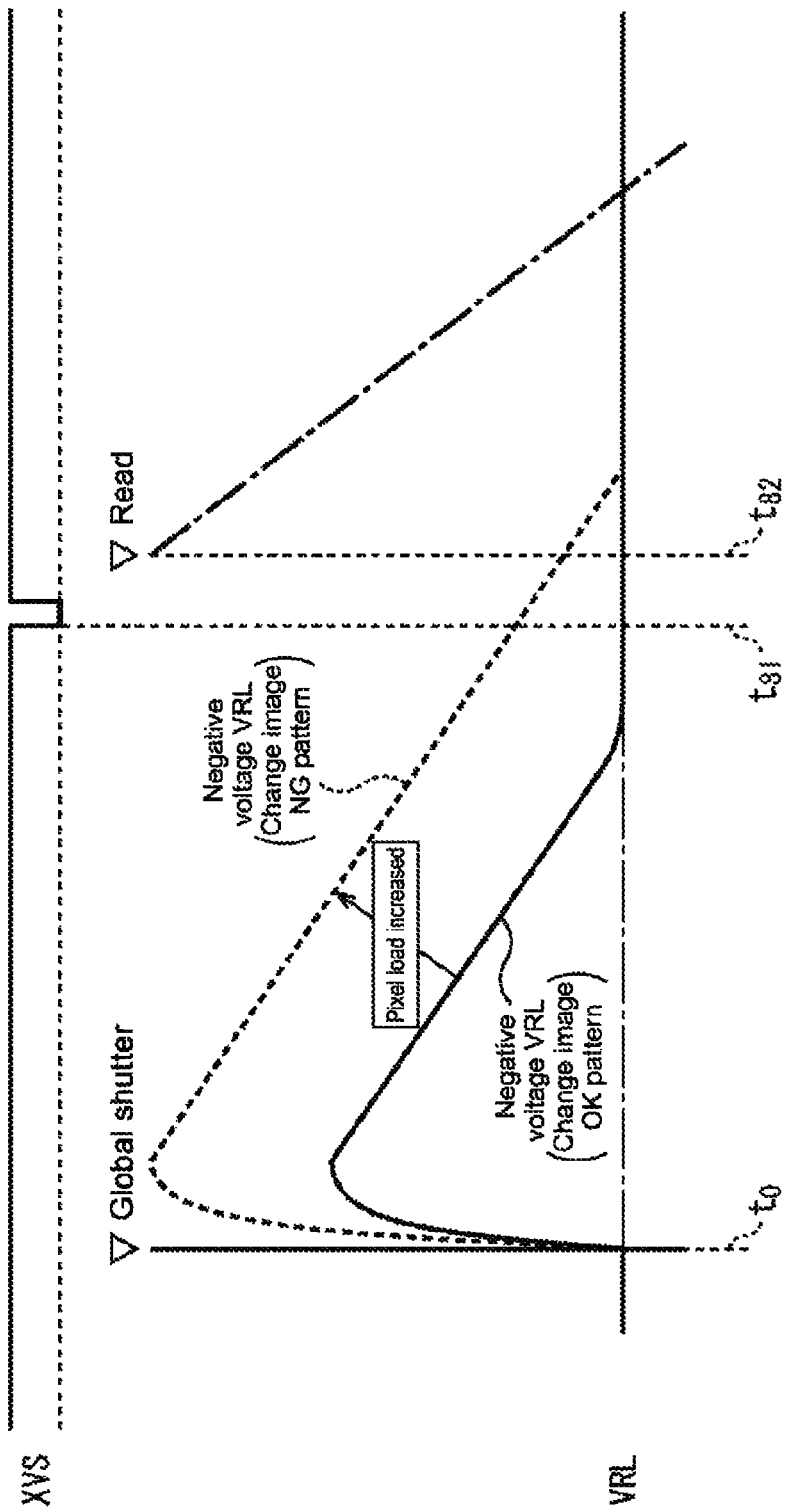
FIG. 8 A timing chart for illustrating the behavior of the typical driving circuit in global shuttering.

In other words, in a global shutter, exposure of all the pixels to light is started simultaneously. Therefore, as shown in FIG. 8, a larger number of pixels are shuttered-on simultaneously. Accordingly, the variation of the negative voltage VRL is larger, and therefore the time period until the variation ends is also longer in proportion thereto. According to countermeasures against that, in the time period between the drop of the readout-start pulse XVS and the start of reading-out (Read in FIG. 8), the negative voltage VRL is decreased, the variation ends, and the number of pixels is appropriate to be read out.

In FIG. 8, since the variation of the negative voltage VRL shown by the solid line ends by the time t81 at which the readout pulse XVS rises, it is possible to start reading-out at the time t82. However, since the variation of the negative voltage VRL shown by the dotted line does not end yet by the time t82, i.e., the time to start reading-out, no countermeasures are taken against that.

Figure 9:
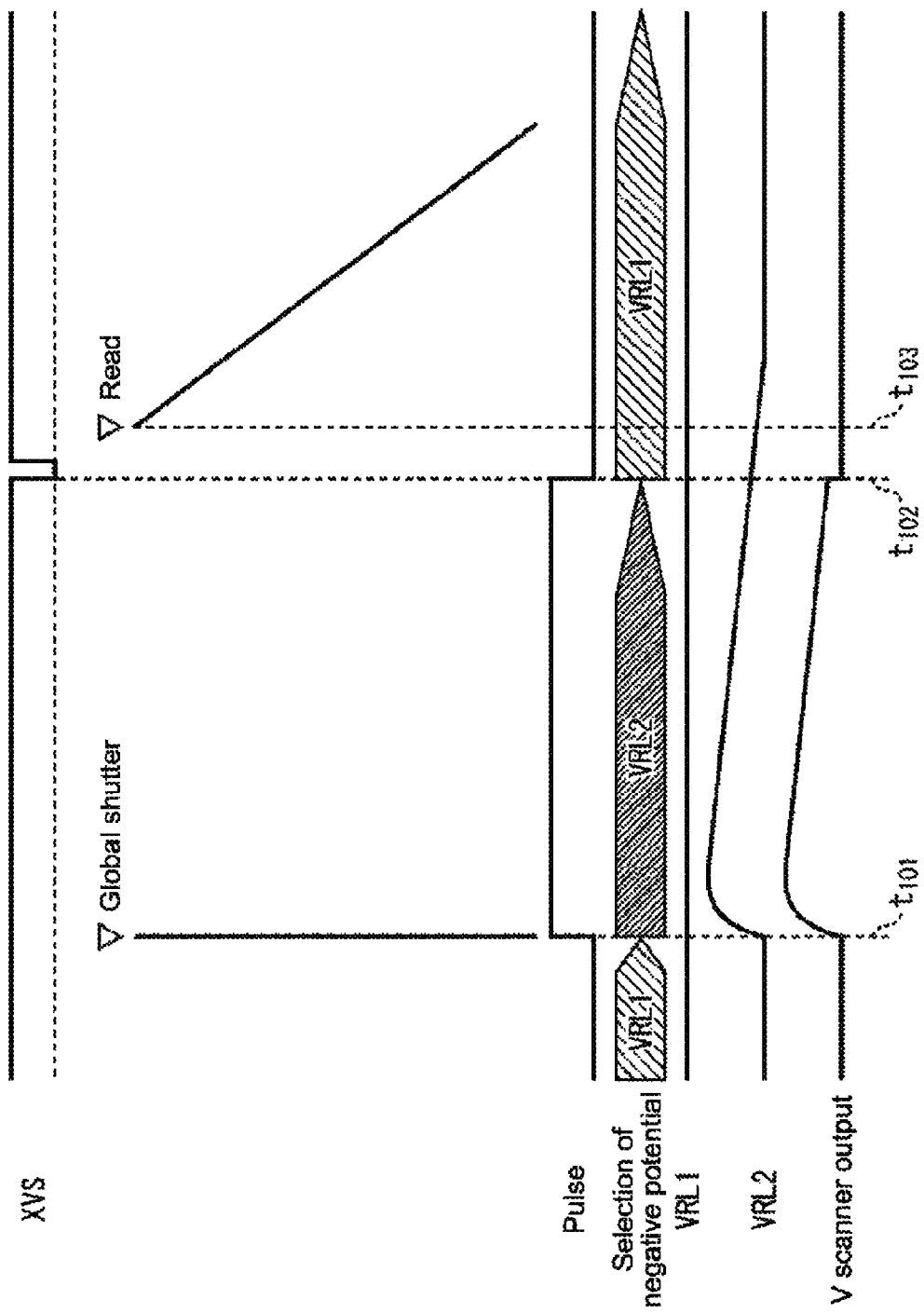
FIG. 9 A timing chart for illustrating the behavior of the driving circuit of FIG. 1 in global shuttering.

In view of this, as shown in FIG. 9, at the time t101 at which the global shutter is turned on, the pulse-generation controller 31 generates the driving pulse. As a result, the transistor 51-1 is turned off and the transistor 51-2 is turned on. As a result, the V scanner 35 outputs the negative voltage VRL2 from the negative voltage capacitor 34-2 charged by the charge pump circuit 33-2.

As a result, the variation of the negative voltage VRL2 occurs in the electric charge consumption time period of the global shutter. As a result, the output from the V scanner 35 also varies.

However, the negative voltage VRL1 is always constant during this time period since the negative voltage VRL1 is not affected by the variation of the negative voltage VRL2.

When the readout pulse XVS drops at the time t102, the pulse-generation controller 31 stops generating the driving pulse. As a result, the transistor 51-1 is turned on and the transistor 51-2 is turned off. As a result, the V scanner 35 outputs the negative voltage VRL1 from the negative voltage capacitor 34-1 charged by the charge pump circuit 33-1.

Then, the pixel signal is read at the time t103.

As a result, the negative voltage VRL of the global shutter is less affected, and countermeasures are taken appropriately irrespective of the number of pixels. Therefore there is no adverse effect even in upsizing an image sensor.

Modification Example

In the above-mentioned example, by providing the two charge pump circuit systems, one being selected when the negative voltage VRL varies and the other being selected other than that, the variation of the negative voltage VRL is prevented from occurring when offset and data are read. Alternatively, the negative voltage to the rows, which share the floating diffusion with the readout row, may be previously separated from the negative voltage to the non-selected rows, and the negative voltages VRL1, VRL2 may be supplied independently.

Figure 10:
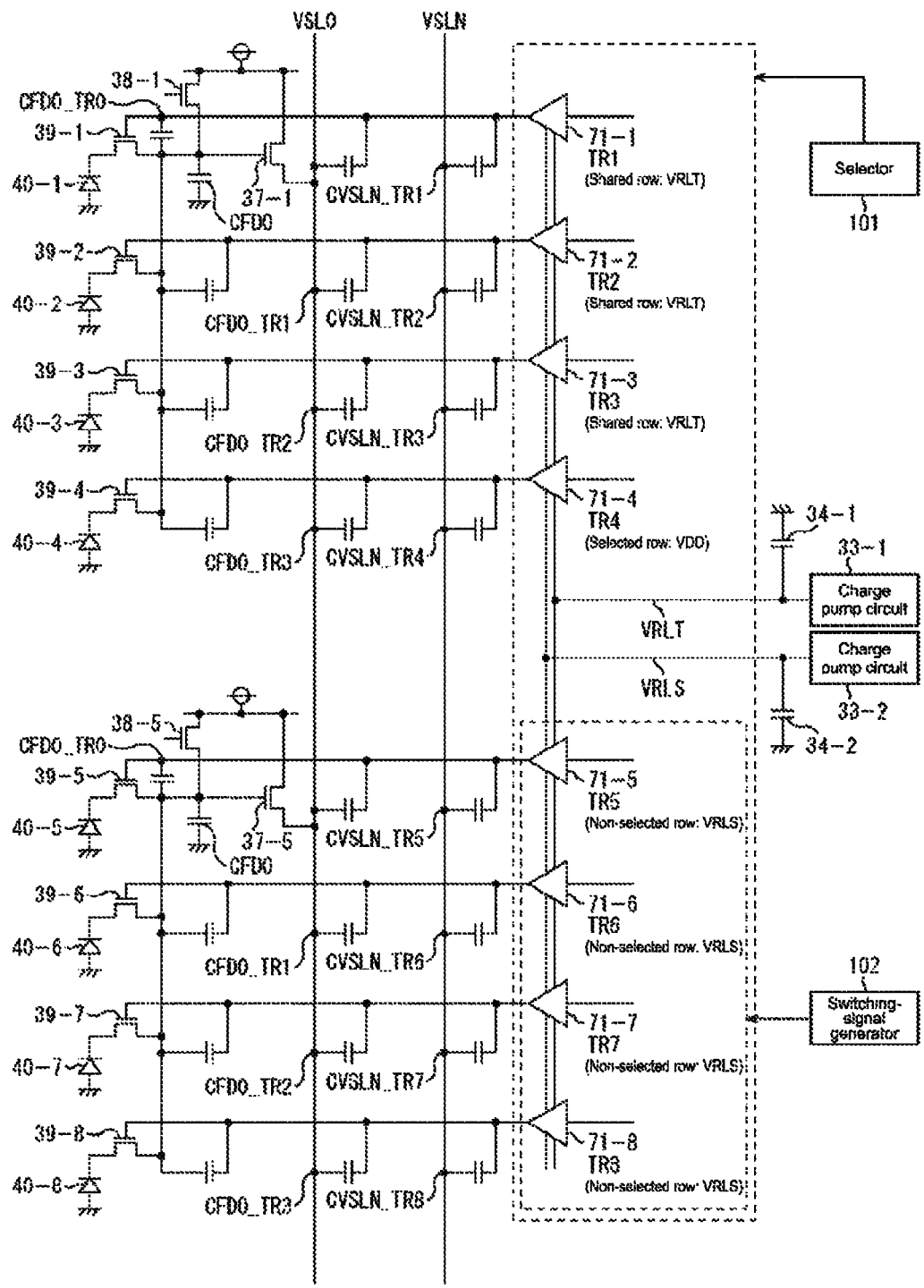
FIG. 10 A diagram showing a modification example of a circuit for driving an image sensor to which the present technology is applied.

As shown in FIG. 10, the negative voltage VRL of the circuit for driving an image sensor is divided into the negative voltage VRLT and the negative voltage VRLS being the same. The negative voltage VRLT is supplied to the rows, which share the floating diffusion with the readout row (selected row), and the negative voltage VRLS is supplied to the rest non-selected rows. Further, the circuit for driving an image sensor of FIG. 10 supplies the negative voltage VRLT to some of the non-selected rows depending on the degree of clipped whites. As a result, streaking is reduced appropriately. Note that, in FIG. 10, the configurations whose functions are the same as the functions of the configurations described with reference to FIG. 1 and FIG. 3 will be denoted by the same reference symbols and the same names, and description thereof will be omitted arbitrarily.

In other words, more specifically, in the circuit for driving an image sensor of FIG. 10, the charge pump circuit 33-1 and the negative voltage capacitor 34-1 output the negative voltage VRLT to the amplifiers 71-1 to 71-8, and the charge pump circuit 33-2 and the negative voltage capacitor 34-2 output the negative voltage VRLS to the amplifiers 71-1 to 71-8.

The selector 101 selects one of the negative voltage VRLT from the charge pump circuit 33-1 (the negative voltage capacitor 34-1) and the negative voltage VRLS from the charge pump circuit 33-2 (the negative voltage capacitor 34-2) to be supplied to each of the amplifiers 71-1 to 71-8.

In other words, when a row corresponding to the amplifier 71-4 is the selected row, i.e., the readout row, the selector 101 supplies the negative voltage VRLT to the amplifiers 71-1 to 71-3 of the rows, which share the floating diffusion CFD0 with the selected row. Further, the selector 101 supplies the negative voltage VRLS to the amplifiers 71-5 to 71-8 corresponding to the non-selected rows, which do not share the floating diffusion CFD0 with the selected row. This example will be described.

Figure 11:
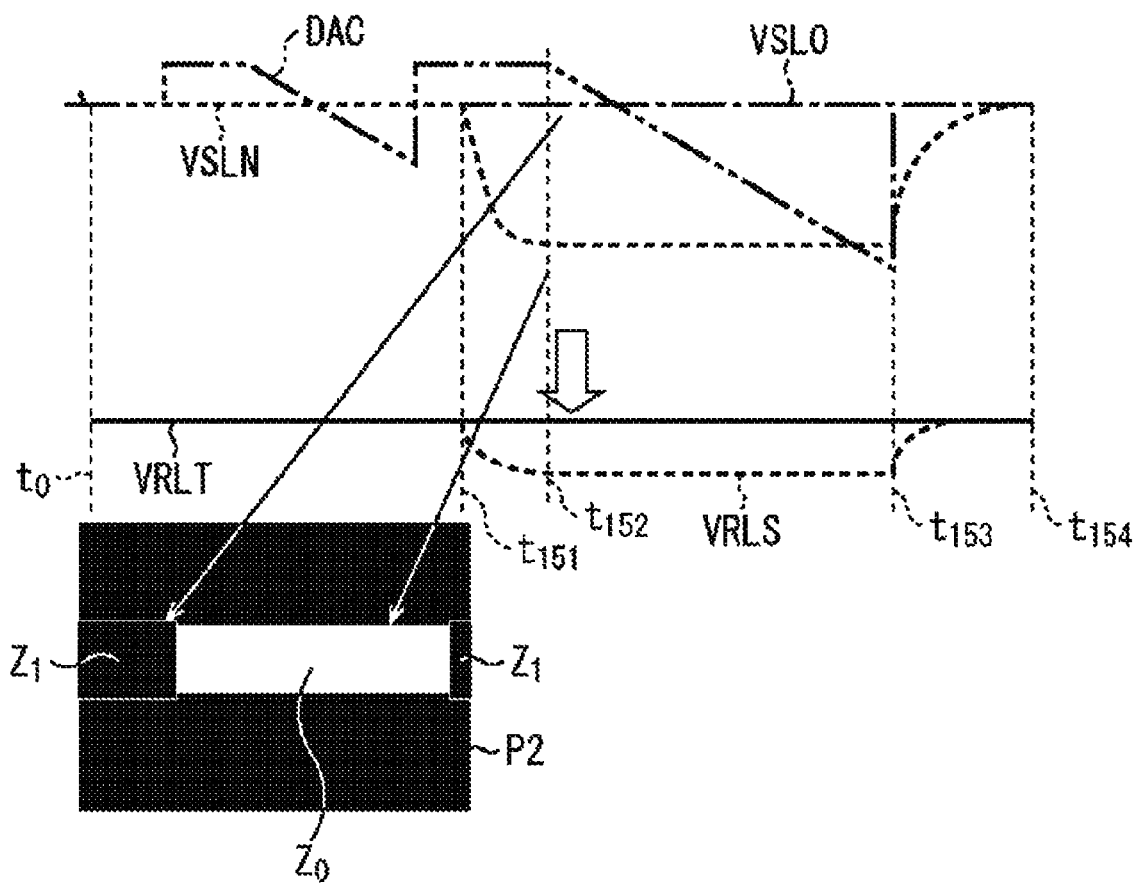
FIG. 11 A timing chart for illustrating the behavior of the driving circuit of FIG. 10.

As described above, the vertical transfer line voltage VSL0 varies because the voltage of the floating diffusion CFD0 varies due to variation of the negative potential VRL. In view of this, the selector 101 supplies the negative voltage VRLT to the shared rows, i.e., the non-selected rows, which share the floating diffusion CFD0 with the selected row, and the negative voltage VRLS to the non-selected rows, divisionally. Therefore, for example, as shown in FIG. 11, even if the voltage of the negative voltage VRLS is decreased together with decrease of the voltage of the vertical transfer line voltage VSLN at the time t151 at which exposure to light is started, the negative voltage VRLT is not affected and the vertical transfer line voltage VSL0 is therefore not affected. As a result, the signal is read appropriately in the signal-readout time period between the time t152 to t153.

As a result, as shown in the lower-left part of FIG. 11, even if the area Z0 of the image P2 is exceptionally white (pixel value=maximum), the area except the area Z0 is black (pixel value=minimum), and it is possible to prevent the occurrence of streaking, in which the areas Z1 contain clipped-whites.

Further, as described above, clipped-whites are generated due to the amplitude of the vertical transfer line voltage VSL0. Depending on the amplitude of the vertical transfer line voltage VSL0, so-called clipped-blacks, i.e., a phenomenon that generates darker black areas, may occur.

Figure 12:
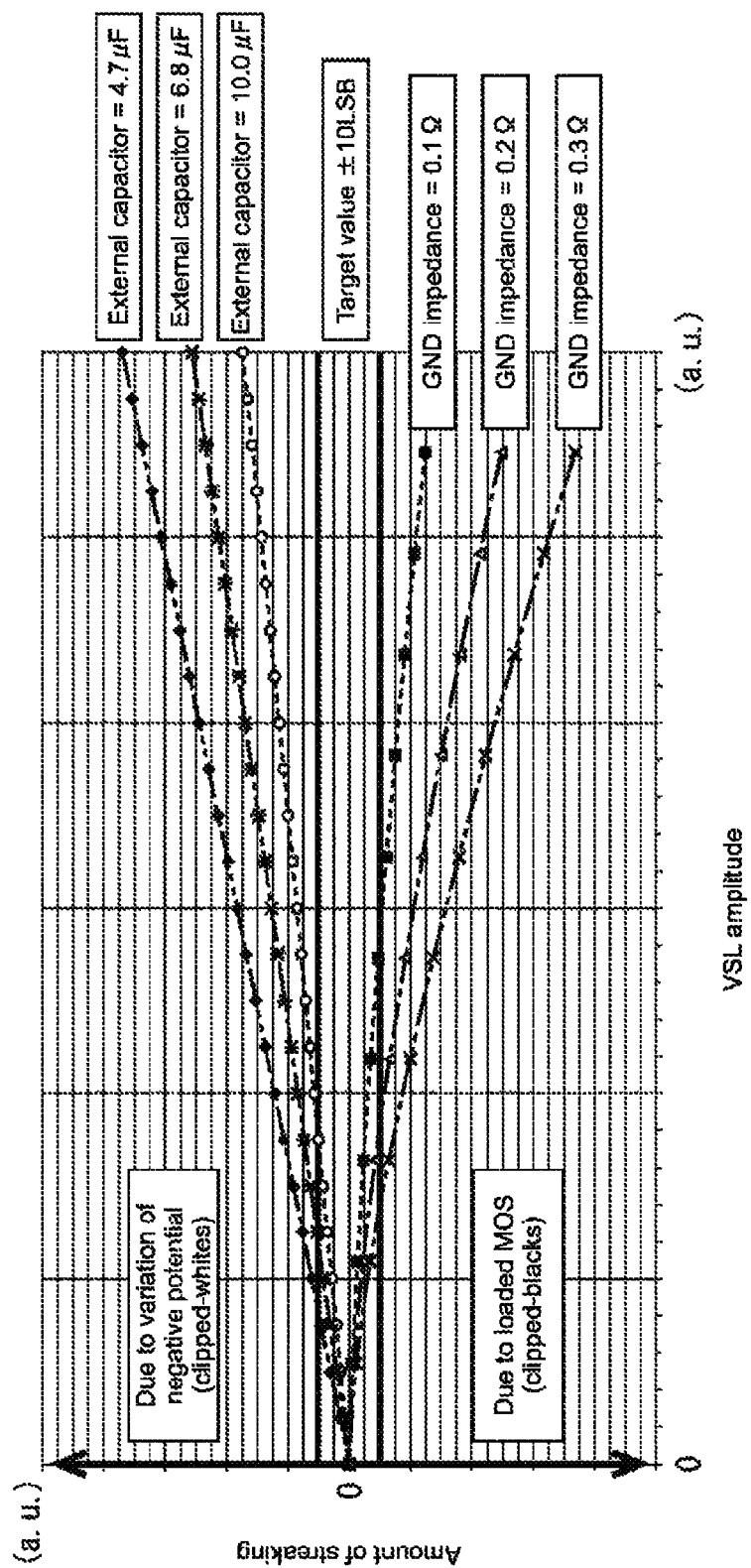
FIG. 12 A timing chart for illustrating clipped-whites and clipped-blacks.
Figure 13:
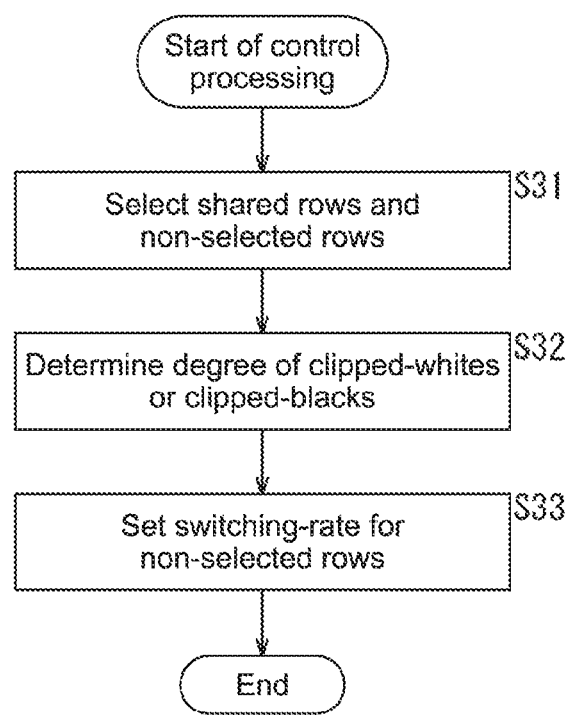
FIG. 13 A flowchart for illustrating a control processing of the driving circuit of FIG. 10.

FIG. 12 shows variations of streaking that occurs depending on the amplitude of the vertical transfer line voltage VSL0. It shows that the larger the external capacitor, i.e., the negative voltage capacitor, the smaller the blown-out-highlights (clipped-whites). FIG. 12 shows the variations in which the external capacitors are 4.7 µF, 6.8 µF, and 10.0 µF. Further, it shows that the larger the GND impedance, the larger the clipped-blacks. FIG. 12 shows the variations in which the GND impedances are 0.1 Ω, 0.2 Ω, and 0.3 Ω.

In view of the above, if effects of the variation of the negative voltage are completely removed by using the above-mentioned method, a phenomenon such as clipped-whites and clipped-blacks may occur adversely.

In view of this, the switching-signal generator 102 intentionally controls the effects of the negative voltage to thereby reduce occurrence of the above-mentioned phenomenon such as clipped-whites and clipped-blacks. Specifically, the switching-signal generator 102 assigns the negative voltage VRLT from the charge pump circuit 33-1 to a predetermined percentage of the non-selected rows at predetermined intervals depending on an evaluation value of clipped-whites or clipped-blacks.

It is possible to reduce occurrence of a visually-affected phenomenon such as clipped-whites and clipped-blacks by controlling the effects of the variation of the negative voltage according to this operation.

<Control Processing of the Circuit for Driving an Image Sensor of FIG. 10>

Next, the control processing of the circuit for driving an image sensor of FIG. 10 will be described.

In Step S31, the selector 101 supplies the negative voltage VRLT from the charge pump circuit 33-1 to the amplifiers 71 of the shared rows, which share the floating diffusion with the selected row, depending on the selected row, and supplies the negative voltage VRLS from the charge pump circuit 33-2 to the other rows, i.e., the non-selected rows. Accordingly, in FIG. 10, since the selected row corresponds to the amplifier 71-4, the negative voltage VRLT from the charge pump circuit 33-1 is supplied to the amplifiers 71-1 to 71-3, and the negative voltage VRLS from the charge pump circuit 33-2 is supplied to the amplifiers 71-5 to 71-8 corresponding to the other rows, i.e., the non-selected rows.

In Step S32, the degree of clipped-whites or clipped-blacks of the present image captured by the image sensor is determined. An apparatus, which is capable of controlling the degree of clipped-whites or clipped-blacks of the image, may determine the degree of clipped-whites or clipped-blacks based on the evaluation value.

In Step S33, the switching-signal generator 102 sets a switching-rate for selecting the amplifiers 71 corresponding to a predetermined percentage of the non-selected rows at predetermined intervals, to which the negative voltage VRLS is supplied from the charge pump circuit 33-2, depending on the degree of clipped-whites or clipped-blacks. Hereinafter, the charge pump circuit 33-2 supplies the negative voltage VRLS to the amplifiers 71 corresponding to a predetermined percentage of the non-selected rows at predetermined intervals based on the set switching-rate.

Note that the above-mentioned processing may be repeated as necessary.

According to the above-mentioned processing, it is possible to reduce the variation of the negative voltage without increasing the negative voltage capacitor, and it is possible to reduce occurrence of streaking such as clipped-whites and clipped-blacks.

Incidentally, a series of processing described above can be executed by hardware or software. In the case where the series of processing is executed by software, a program constituting the software recorded in a recording medium is installed in a computer incorporated in dedicated hardware, a general-purpose computer that can execute various functions by installing various programs therein, for example, and another computer.

Figure 14:
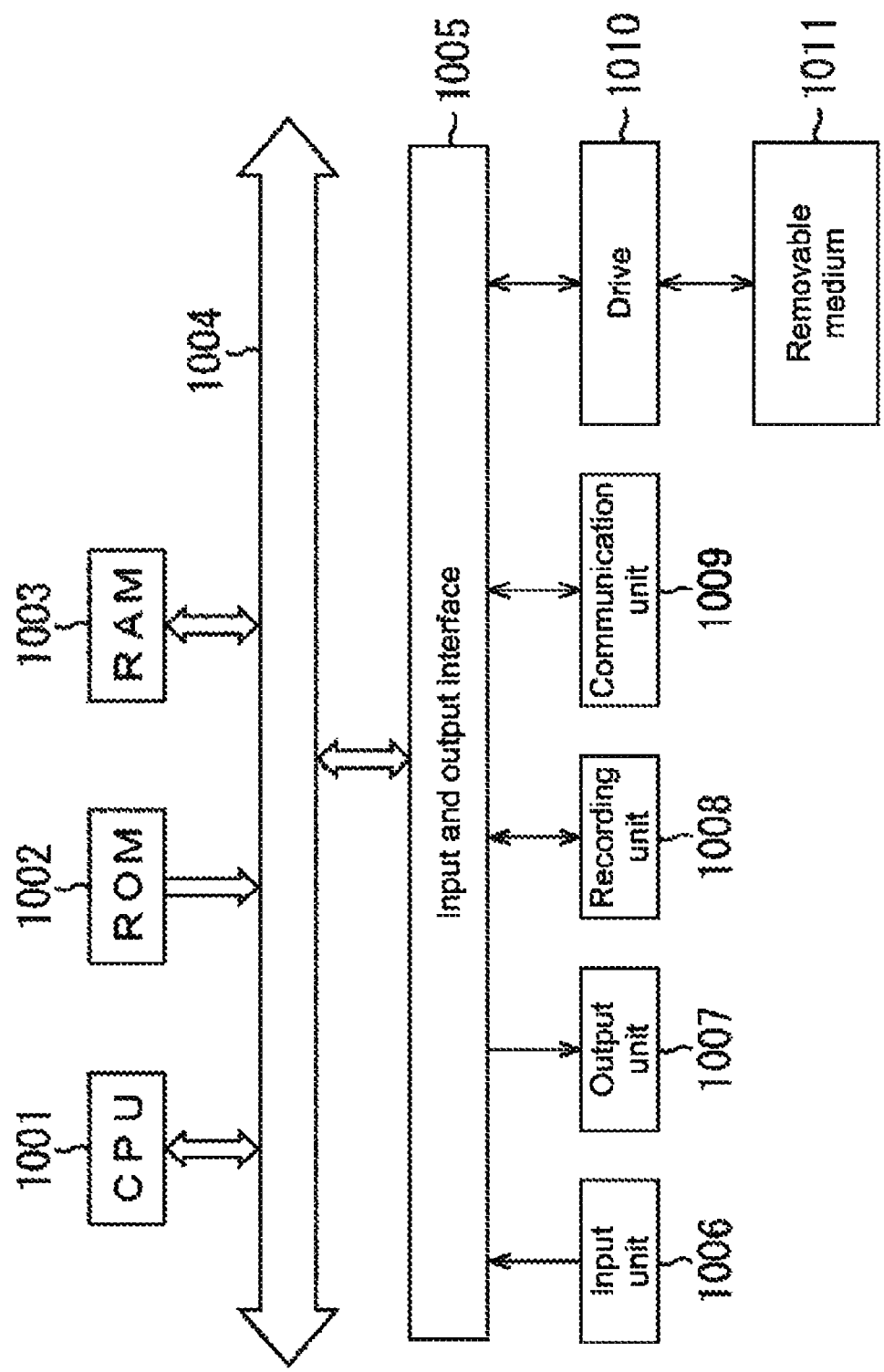
FIG. 14 A diagram showing an example of the configuration of a general-purpose personal computer.

FIG. 14 shows an example of the configuration of a general-purpose personal computer. The personal computer includes the CPU (Central Processing Unit) 1001 therein. The input and output interface 1005 is connected to the CPU 1001 via the bus 1004. The ROM (Read Only Memory) 1002 and the RAM (Random Access Memory) 1003 are connected to the bus 1004.

The input unit 1006 including input devices such as a keyboard and a mouse with which a user inputs operation commands, the output unit 1007 that outputs images such as processing operation screens and operation results to the display device, the recording unit 1008 including a hard disk drive and the like that store programs and various kinds of data, and the communication unit 1009 including a LAN (Local Area Network) adapter and the like that process communication via a network such as the Internet, are connected to the input and output interface 1005. Further, there is connected the drive 1010 that reads/writes data from/in the removable medium 1011 such as a magnetic disc (including a flexible disc), an optical disc (including a CD-ROM (Compact Disc-Read Only Memory) and a DVD (Digital Versatile Disc)), a magneto-optical disc (including an MD (Mini Disc)), and a semiconductor memory.

The CPU 1001 executes various kinds of processing on the basis of the programs recorded in the ROM 1002, or the programs read from the removable medium 1011 such as a magnetic disc, an optical disc, a magneto-optical disc, and a semiconductor memory, installed in the recording unit 1008, and loaded in the RAM 1003 from the recording unit 1008. The RAM 1003 further records data necessary for the CPU 1001 to execute various kinds of processing, and the like, as necessary.

In the computer configured as described above, the CPU 1001 loads a program, which is recorded in, for example, the recording unit 1008, to the RAM 1003 via the input and output interface 1005 and the bus 1004 for execution, and the above-mentioned series of processing is thus performed.

The program executed by the computer (CPU 1001) can be recorded on the removable medium 1011 serving as a package medium or the like, and then provided. Further, the program can be provided via a wired or wireless transmission medium such as a local area network, the Internet, and digital satellite broadcasting.

In the computer, the program can be installed in the recording unit 1008 via the input and output interface 1005 when the removable medium 1011 is mounted to the drive 1010. Further, the program can be received in the the communication unit 1009 via the wired or wireless transmission medium and then installed in the recording unit 1008. In addition, the program can be installed previously in the ROM 1002 or the recording unit 1008.

It should be noted that the program executed by the computer may be a program that is processed chronologically along the described order in this specification or may be a program that is processed in parallel or at a necessary timing such as when an invocation is performed.

Further, in the specification, a system means a set of a plurality of configuration elements (apparatuses, modules (members), etc.), and it does not matter whether all the configuration elements are in a single housing. Therefore a system includes a plurality of apparatuses accommodated in different housings and connected via a network, and a single apparatus including a plurality of modules accommodated in a single housing.

Further, embodiments of the present technology are not limited to the embodiment described above and can be variously modified without departing from the gist of the present technology.

For example, the present technology can have a configuration of cloud computing in which a plurality of apparatuses share one function and cooperate to perform processing via a network.

Further, the steps described in the flowcharts described above can be executed by one apparatus or shared and executed by a plurality of apparatuses.

In addition, in the case where one step includes a plurality of processing steps, the plurality of processing steps in one step can be executed by one apparatus or shared and executed by a plurality of apparatuses.

Furthermore, the present technology can have the following configurations.

(1) An image sensor, including:

photodiodes, each of the photodiodes generating an electric charge corresponding to an intensity of incident light for each pixel;

readout transistors, each of the readout transistors reading the electric charge generated by each of the photodiodes;

a first negative voltage supplier that supplies a negative voltage to the readout transistors when the readout transistors are not turned on; and a second negative voltage supplier that supplies a negative voltage to the readout transistors when the readout transistors are not turned on, in which one of the first negative voltage generator and the second negative voltage generator is selected and supplies the negative voltage.

(2) The image sensor according to (1), in which the first negative voltage supplier is selected and supplies the negative voltage at a time of start of exposure of the photodiodes to light and at a time of resetting, and the second negative voltage supplier is selected and supplies the negative voltage at times other than those times.

(3) The image sensor according to (2), further including:

a pulse generator that generates a pulse signal, in which the first negative voltage supplier is selected and supplies the negative voltage at a time of start of exposure of the photodiodes to light and at a time of resetting, and the second negative voltage supplier is selected and supplies the negative voltage at times other than those times, on the basis of a pulse generated by the pulse generator.

(4) The image sensor according to any one of (1) to (3), in which the first negative voltage supplier is a first negative voltage capacitor, and the second negative voltage supplier is a second negative voltage capacitor.

(5) The image sensor according to (4), in which each of the first negative voltage capacitor and the second negative voltage capacitor is charged by a charge pump circuit.

(6) The image sensor according to (1), in which the first negative voltage supplier is selected and supplies the negative voltage to the readout transistors of rows sharing a floating diffusion with a transistor of a readout row out of the readout transistors not turned on, and the second negative voltage supplier is selected and supplies the negative voltage to the readout transistors of non-selected rows other than those rows.

(7) The image sensor according to (6), in which the first negative voltage supplier supplies the negative voltage to a predetermined percentage of the non-selected rows at predetermined intervals.

(8) A method of driving an image sensor including
photodiodes, each of the photodiodes generating an electric charge corresponding to an intensity of incident light for each pixel,
readout transistors, each of the readout transistors reading the electric charge generated by each of the photodiodes,
a first negative voltage supplier that supplies a negative voltage to the readout transistors when the readout transistors are not turned on, and
a second negative voltage supplier that supplies a negative voltage to the readout transistors when the readout transistors are not turned on,
the method including:
selecting one of the first negative voltage generator and the second negative voltage generator, and supplying the negative voltage by the selected negative voltage generator.

(9) A program, causing a computer that controls an image sensor including
photodiodes, each of the photodiodes generating an electric charge corresponding to an intensity of incident light for each pixel,
readout transistors, each of the readout transistors reading the electric charge generated by each of the photodiodes,
a first negative voltage supplier that supplies a negative voltage to the readout transistors when the readout transistors are not turned on, and
a second negative voltage supplier that supplies a negative voltage to the readout transistors when the readout transistors are not turned on,
to select one of the first negative voltage generator and the second negative voltage generator, and supply the negative voltage by the selected negative voltage generator.

(10) An electronic apparatus, including:
photodiodes, each of the photodiodes generating an electric charge corresponding to an intensity of incident light for each pixel;
readout transistors, each of the readout transistors reading the electric charge generated by each of the photodiodes;
a first negative voltage supplier that supplies a negative voltage to the readout transistors when the readout transistors are not turned on; and
a second negative voltage supplier that supplies a negative voltage to the readout transistors when the readout transistors are not turned on, in which
one of the first negative voltage generator and the second negative voltage generator is selected and supplies the negative voltage.

DESCRIPTION OF NUMERALS 31 pulse generate control circuit, 32 inverter, 33, 33-1, 33-2 charge pump circuit, 34, 34-1, 34-2 negative voltage capacitor, 35 V scanner, 36 selection transistor, 37 amplifier transistor, 38 reset transistor, 39 readout transistor, 40 photodiode, 101 selector, 102 switching-signal generator

What is claimed is:
1. An image sensor, comprising:
photodiodes, each of the photodiodes generating an electric charge corresponding to an intensity of incident light for each pixel;
readout transistors, each of the readout transistors reading the electric charge generated by each of the photodiodes;
a first negative voltage supplier that supplies a negative voltage to the readout transistors when the readout transistors are not turned on; and
a second negative voltage supplier that supplies a negative voltage to the readout transistors when the readout transistors are not turned on, wherein
one of the first negative voltage generator and the second negative voltage generator is selected and supplies the negative voltage.

2. The image sensor according to claim 1, wherein
the first negative voltage supplier is selected and supplies the negative voltage at a time of start of exposure of the photodiodes to light and at a time of resetting, and the second negative voltage supplier is selected and supplies the negative voltage at times other than those times.

3. The image sensor according to claim 2, further comprising:
a pulse generator that generates a pulse signal, wherein
the first negative voltage supplier is selected and supplies the negative voltage at a time of start of exposure of the photodiodes to light and at a time of resetting, and the second negative voltage supplier is selected and supplies the negative voltage at times other than those times, on the basis of a pulse generated by the pulse generator.

4. The image sensor according to claim 1, wherein
the first negative voltage supplier is a first negative voltage capacitor, and the second negative voltage supplier is a second negative voltage capacitor.

5. The image sensor according to claim 4, wherein
each of the first negative voltage capacitor and the second negative voltage capacitor is charged by a charge pump circuit.

6. The image sensor according to claim 1, wherein
the first negative voltage supplier is selected and supplies the negative voltage to the readout transistors of rows sharing a floating diffusion with a transistor of a readout row out of the readout transistors not turned on, and the second negative voltage supplier is selected and supplies the negative voltage to the readout transistors of non-selected rows other than those rows.

7. The image sensor according to claim 6, wherein
the first negative voltage supplier supplies the negative voltage to a predetermined percentage of the non-selected rows at predetermined intervals.

8. A method of driving an image sensor including:
photodiodes, each of the photodiodes generating an electric charge corresponding to an intensity of incident light for each pixel,
readout transistors, each of the readout transistors reading the electric charge generated by each of the photodiodes,
a first negative voltage supplier that supplies a negative voltage to the readout transistors when the readout transistors are not turned on, and
a second negative voltage supplier that supplies a negative voltage to the readout transistors when the readout transistors are not turned on,
the method comprising:
selecting one of the first negative voltage generator and the second negative voltage generator, and supplying the negative voltage by the selected negative voltage generator.

9. A non-transitory computer-readable medium storing a program, which causes a computer to control an image sensor including: photodiodes, each of the photodiodes generating an electric charge corresponding to an intensity of incident light for each pixel, readout transistors, each of the readout transistors reading the electric charge generated by each of the photodiodes, a first negative voltage supplier that supplies a negative voltage to the readout transistors when the readout transistors are not turned on, and a second negative voltage supplier that supplies a negative voltage to the readout transistors when the readout transistors are not turned on, to select one of the first negative voltage generator and the second negative voltage generator, and supply the negative voltage by the selected negative voltage generator.

10. An electronic apparatus, comprising:
photodiodes, each of the photodiodes generating an electric charge corresponding to an intensity of incident light for each pixel;
readout transistors, each of the readout transistors reading the electric charge generated by each of the photodiodes;
a first negative voltage supplier that supplies a negative voltage to the readout transistors when the readout transistors are not turned on; and
a second negative voltage supplier that supplies a negative voltage to the readout transistors when the readout transistors are not turned on, wherein
one of the first negative voltage generator and the second negative voltage generator is selected and supplies the negative voltage.

* * * * *